United States Patent [19]

Minamida

[11] Patent Number: 4,560,015

[45] Date of Patent: * Dec. 24, 1985

[54] COMBINATORIAL WEIGHING APPARATUS

[75] Inventor: Kazukiyo Minamida, Shiga, Japan

[73] Assignee: Kabushiki Kaisha Ishida Koki Seisakusho, Kyoto, Japan

[*] Notice: The portion of the term of this patent subsequent to Jun. 19, 2001 has been disclaimed.

[21] Appl. No.: 621,386

[22] Filed: Jun. 18, 1984

Related U.S. Application Data

[63] Continuation of Ser. No. 414,648, Sep. 3, 1982, Pat. No. 4,454,924.

[30] Foreign Application Priority Data

Sep. 4, 1981 [JP] Japan .................................. 56-139982

[51] Int. Cl.⁴ ...................... G01G 19/22; G01G 13/16
[52] U.S. Cl. .......................................... 177/25; 177/59
[58] Field of Search ......................... 177/1, 25, 59, 114

[56] References Cited

U.S. PATENT DOCUMENTS 4,454,924  6/1984  Minamida ............................. 177/25

Primary Examiner—E. A. Goldberg
Assistant Examiner—Patrick W. Foster
Attorney, Agent, or Firm—Staas & Halsey

[57] ABSTRACT

A combinatorial weighing apparatus of the type in which the batches of article charged in a plurality of hoppers are weighed and the best combination of hoppers which provides a total weight equal to or most closely approximating a target weight within a predetermined tolerance is selected, the batches of article in the hoppers constituting the best combination being then discharged to a collecting chute.

The combinatorial weighing apparatus has a plurality of weighing hoppers for receiving batches of article to be weighed, weight sensors for weighing the batches of article in the weighing hoppers, storage hoppers disposed beneath the second hopper gates in the weighing hoppers and adapted to receive the batches of article discharged from the weighing hoppers, and a combination control section adapted to select the best combination of hoppers which provides a total weight equal to or most closely approximating the target value, on the basis of the weight values of batches of article in the storage hoppers and the weighing hoppers.

8 Claims, 8 Drawing Figures

COMBINATORIAL WEIGHING APPARATUS

CROSS REFERENCE TO RELATED APPLICATION

This application is a continuation of U.S. application Ser. No. 414,648 filed Sept. 3, 1982 now U.S. Pat. No. 4,454,924.

BACKGROUND OF THE INVENTION

The present invention relates to a combinatorial weighing apparatus and, more particularly, to a combinatorial weighing apparatus of the type having a plurality of weighing hoppers and adapted for weighing articles through the steps of finding the weight of batch of article in each weighing hopper, selecting the combination of weighing hoppers which gives a total weight equal to or closest to a present target weight (hereafter referred to as the "best" combination) and discharging the batches of article from the weighing hoppers constituting the selected combination.

Generally, a combined weighing apparatus incorporating a computer, referred to as "computer scale", is used for accurately weighing articles which exhibit large variation in weight from one to another, e.g. fruits and vegetables, confectionaries, fabricated articles, perishables or the like.

Figure 1:
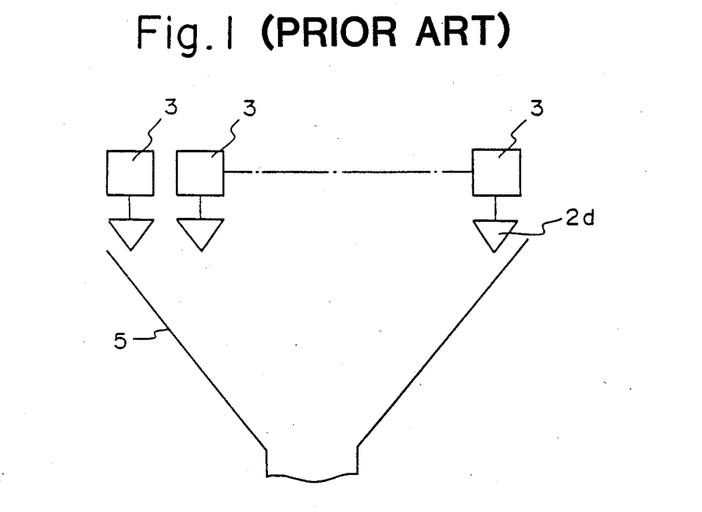
FIG. 1 is a schematic illustration of a conventional combinatorial weighing apparatus.

In such a combinatorial weighing apparatus as shown in FIG. 1, batches of the article to be weighed are put into a plurality of weighing hoppers 2d and weighed in respective hoppers by weight sensors 3. Then, the apparatus selects a combination of batches which provides a total weight closest to the target weight within a predetermined tolerance using the weighing outputs derived from the weight sensors 3. The batches constituting the selected combination are then discharged into a collecting hopper 5 and the evacuated weighing hoppers are charged with new batches of the article for the next cycle of weighing operation. This operation is repeated to achieve the automatic weighing of the article.

Figure 2:
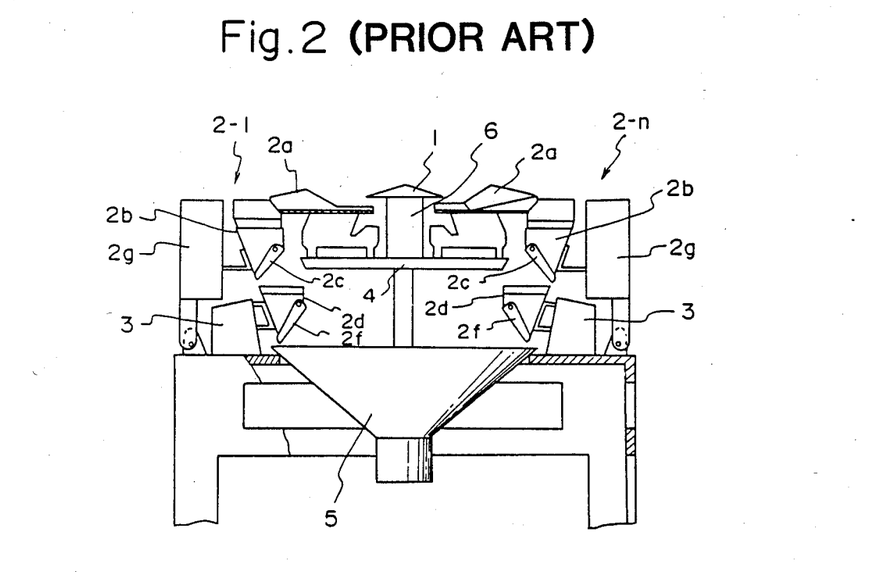
FIG. 2 shows in detail the general arrangement of the combinatorial weighing apparatus shown in FIG. 1.
Figure 3:
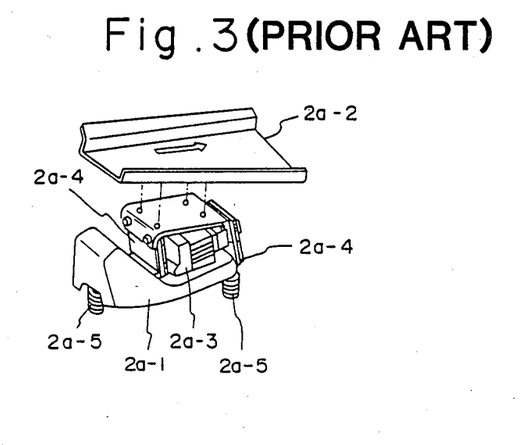
FIG. 3 shows a distribution supply device incorporated in the combinatorial weighing apparatus shown in FIG. 2.
Figure 4:
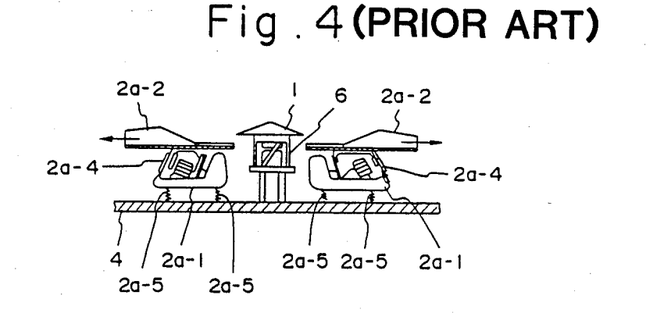
FIG. 4 is a front elevational view illustrating the arrangement of the distribution supply device shown in FIG. 3.
Figure 5:
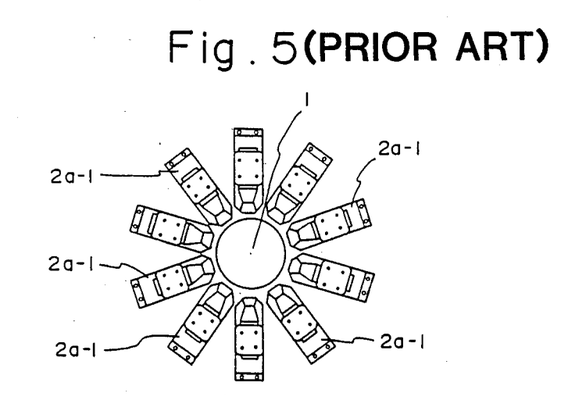
FIG. 5 is a top plan view illustrating the arrangement of the distribution supply device shown in FIG. 3.

Referring to FIG. 2 schematically showing the mechanism of a combinatorial weighing apparatus, a distribution table 1 is adapted to disperse the article to be weighed in the radial direction and to distribute the dispersed batches of article to a plurality of weighing stations 2 arranged radially around the distribution table 1. The distribution table 1 is adapted to be vibrated by a vibrator or the like, so that the dispersed article is distributed to the weighing stations 2 as a result of the vibration of the table for a predetermined time length. In the illustrated embodiments, n weighing stations designated at 2-1 to 2-n are arranged, and each weighing station includes a distribution supply device 2a, pool hopper 2b, pool hopper gate 2c, weighing hopper 2d, weight sensor 2e, weighing hopper gate 2f and a hopper drive unit 2g. As shown in FIG. 3, the distribution supply device 2a is composed of a feeder base 2a-1 having a predetermined shape and a trough 2a-2 mounted on the feeder base 2a-1 through a leaf spring 2a-4. A solenoid 2a-3 is fixed to the upper side of the leeder base 2a-1. A solenoid 2a-3 is mounted on the feeder base 2a-1. As will be seen from FIGS. 4 and 5, a plurality of distribution supply devices 2a are carried by a circular support member 4 through respective coiled springs 2a-5 and are arranged radially along the outer periphery of the distribution table 1. In operation, the article to be weighed is put on the distribution table 1 while the latter is vibrated reciprocatingly and spirally by an electromagnetic vibrator 6, so that the articles are dispersed radially outwardly along the conical top surface of the distribution table 1 into separate batches which in turn are delivered to respective troughs 2a-2. The batch of articles supplied to each trough 2a-2 is conveyed through the latter in the direction of the arrow in FIG. 3 as a result of a linear reciprocating vibration caused by the magnet 2a-3, and is put into the pool hopper 2b from the end of the trough 2a-2.

Referring back to FIG. 2, each pool hopper 2b is provided with a pool hopper gate 2c. As this pool hopper gate 2c is opened by the operation of the hooper drive unit 2g, the batch of article contained by the pool hopper 2b is put into the weighing hopper 2d. Each weighing hopper 2d is provided with a weight sensor 3 for weighing the batch of article put into the weighing hopper 2d. The output from the weight sensors 3 are delivered to a combination controlling section (not shown) which selects the best combination of the batches of article which provides a total weight most closely approximating the target weight within a predetermined tolerance. Each weighing hopper 2d is provided with a weighing hopper gate 2f. After the selection of the "best" combination, only the weighing hopper gates 2f of the weighing hoppers constituting the "best" combination are opened by the operation of the hopper driving device 2g to let the batches of article go out of these hoppers. These batches of article are then collected at the lower central portion of the weighing apparatus through a collecting chute 5. The collecting chute 5 has a form resembling a conical funnel, and the batches of article dropping onto the peripheral portions of the chute are gathered at the central portion thereof naturally by the force of gravity or forcibly by a scraping means (not shown) or the like.

At the initial stage of the weighing operation, the weighing hoppers 2d are charged with respective batches of articles to be weighed. The weight sensors 2e annexed to these weighing hoppers 2d weigh the batches of articles and deliver weight signals $L_1$ to $L_{10}$ to the combination control section which is not shown. The combination control section then makes a computation of total weight for various hopper combinations and selects a combination which provides a total weight most closely approximating the target weight within a predetermined tolerance. The hopper drive unit 2g then opens the weighing hopper gates of the weighing hoppers constituting the selected "best" combination. In consequence, the batches of articles providing the "best" combination are discharged from these hoppers 2d into the collecting chute 5. Then, the pool hopper gates 2c are opened to charge the evacuated weighing hoppers with new batches of articles. At the same time, the distribution supply devices 2a corresponding to the evacuated pool hoppers 2b are vibrated for a predetermined time to charge the empty pool hoppers 12b with the articles to be weighed. Then, the selection of the "best" combination is made in the same manner as that explained before. The weighing operation by the combinatorial weighing apparatus is thus performed repeatedly and continuously.

In this combinatorial weighing apparatus, a higher weighing accuracy is obtained as the number of combinatorial weighing cycle is increased. To this end, the known combinatorial weighing apparatus employed a lot of weighing sensors to obtain a greater number of weighing combinations, resulting undesirably in a larger size and complicated construction of the weighing apparatus as a whole. Moreover, the cost of the apparatus as a whole is uneconomically raised by employment of a large number of weight sensors which are generally expensive.

BRIEF SUMMARY OF THE INVENTION

Accordingly, an object of the invention is to provide a combinatorial weighing apparatus which is improved to permit an increase in the number of combinatorial weighing cycles to afford a higher weighing accuracy.

Another object of the invention is to provide a combinatorial weighing apparatus capable of attaining a high weighing accuracy without requiring increase in the size of the apparatus.

Still another object of the invention is to provide a combinatorial weighing apparatus capable of attaining higher weighing accuracy without requiring any increase in the number of the weighing hoppers and weight sensors.

It is a further object of the invention to provide a combinatorial weighing apparatus capable of attaining higher weighing accuracy without being accompanied by any rise in the cost of the apparatus.

Other features and advantages of the invention will be apparent from the following description taken in conjunction with the accompanying drawings.

DESCRIPTION OF THE PREFERRED EMBODIMENT

Figure 6:
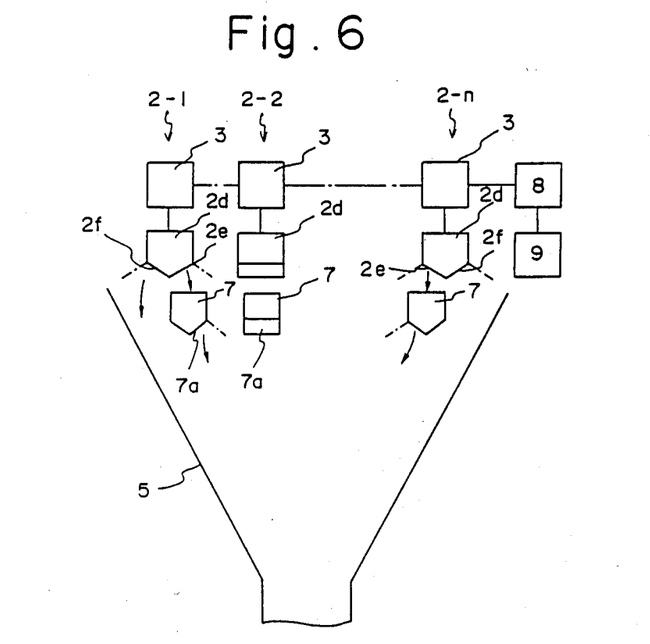
FIG. 6 is a schematic illustration of a combinatorial weighing apparatus in accordance with an embodiment of the present invention.
Figure 7:
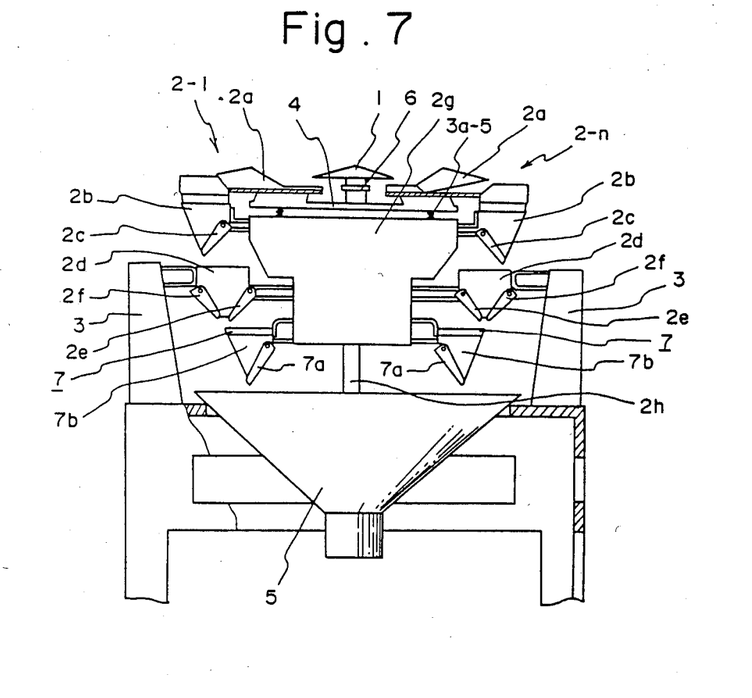
FIG. 7 shows the detail of the general arrangement of the combinatorial weighing apparatus shown in FIG. 6.

A preferred embodiment of the invention will be described with reference to the accompanying drawings. A combinatorial weighing apparatus in accordance with an embodiment of the invention is schematically shown in FIG. 6, while the detail of arrangement of the apparatus is shown in FIG. 7. Throughout these Figures, the same reference numerals are used to denote the same parts or members as those explained before in connection with FIGS. 1 to 5. The combinatorial weighing apparatus has a plurality of weighing stationas 2-1 to 2-n each of which includes, as will be seen from FIG. 7, a distribution supply device 2a, pool hopper 2b, pool hopper gate 2c, weighing hopper 2d, weight sensor 3 and a hopper driving device 2g.

The distribution supply device 2a, pool hopper 2b and the pool hopper gate 2c are identical to those shown in FIG. 2. Each hopper 2d is provided at its bottom with hopper gates 2e and 2f which constitute two independent discharge openings. The arrangement is such that, in operation, either one of the hopper gate 2e and the hopper gate 2f is opened in accordance with a discharge instruction signal. After the evacuation through opening of the hopper gate 2e or 2f, the weighing hopper 2d is supplied with a new batch of articles to be weighed from the pool hopper 2b. The hopper driving device 2g adapted for driving these hopper gates 2e, 2f between open position and close position is installed at the center of the apparatus and is supported by a supporting post 2h. A disc-shaped supporting base 4 carrying the distribution supply devices 2a are mounted on the hopper driving device 2g. The weight sensor 3 provided in each weighing hopper 2d is adapted to measure the weight of the article in the associated weighing hopper 2d. The weight sensors 3 are connected to a memory section 8 for storing the weighing results and a combination control section 9 for conducting a combinatorial computation. A storage hopper 7 is disposed under each weighing hopper 2d, and is provided with a hopper gate 7a which constitutes a single discharge opening. This storage hopper 7 has a supply opening disposed below the inner one 2e of the two hopper gates 2e, 2f of the weighing hopper 2d. Therefore, as the inner gate hopper 2e of the weighing hopper 2e is opened, the article is dischrged into the storage hopper 7 whereas, when the outer hopper gate 2f is opened, the article is dicharged into the collecting chute 5.

The combinatorial weighing apparatus having a construction as previously explained operates in a manner which will be explained as follows.

The article distribution supply devices 2a deliver the articles to be weighed to respective pool hoppers 2b. Then, the hopper drive device 2g drives the levers to open the pool hopper gates 2c thereby to let the batches of articles in the pool hoppers 26 drop into respective weighing hoppers. The batch of articles in each weighing hopper 2d is weighed by the associated weight sensor 3 and the weighing result is stored in the memory section 8.

Then, the levers of the hopper driving section 2g are operated to open the inner hopper gates 2e of all weighing hoppers 2d thereby to supply the batches of articles in respective weighing hoppers 2d into corresponding storage hoppers 7.

Subsequently, the evacuated weighing hoppers 2d are supplied with the batches of articles from the associated pool hoppers 2d and the weight sensors 3 weigh the weights of the newly supplied batches of articles in respective weighing hoppers 2d. The weighing results are transmitted to and stored in the memory section 8.

Thus, all of the weighing hoppers 2d and the storage hoppers 7 are charged with batches of articles to be measured. The weights of these batches of the articles are stored in the memory section 8, and the combinatorial computation is conducted with these data stored in the memory section 8. Namely, the combination control section 9 performs a combinatorial computation using weight values of the batches of articles in the storage hoppers 7 measured in the first weighing cycle and the weights of batches articles now in the weighing hoppers 2d weighed in the second measuring cycle, to select the "best" combination which provides a total weight equal to or most closely approximating the target weight within a predetermined tolerance. Then, the hopper driving device 2g operates the hopper gates 2f and the hopper gates 7a of the selected weighing hoppers 2d and storage hoppers 7 which in combination constitute the best combination, and the batches of articles in these hoppers 2d,7d are discharged into the collecting chute 5.

The memory of weight values in these selected hoppers 2d,7 are erased simultaneously with the discharge of the article therefrom.

The weighing hoppers which have been evacuated as a result of the discharge are then charged with new batches of articles after closing of the hopper gates 2f thereof, and the weights of these new batches of articles are weighed by the weight sensors 3 and delivered to and stored in the memory section 8. Similarly, the hoppers gates 7 of the storage hoppers 7 which have been evacuated as a result of the discharge are closed and the hopper gates 2e of the corresponding weighing hoppers 2d are opened so that the batches of articles are shifted from these weighing hoppers 2d to the evacuated storage hoppers 2d. Then, the weights of these shifted batches of articles are stored in the memory section 8 as the weights of the batches of articles in the storage hoppers. Then, the weighing hoppers 2d, which have been evacuated as a result of the shift of the articles, are charged with new batches of articles from the pool hoppers 2b. The weight of these new batches of articles are then weighed by the weight sensors 3 and stored in the memory section 8.

Subsequently, as the weight data become available with the weights which were not selected in the preceding weighing cycle and with the newly measured weights, the combinatorial computation is conducted by the combination control section 9 with these data for the selection of the new "best" combination which provides a total weight equal to or most closely approximating the target weight. After the selection of the "best" combination, the above-mentioned operation is repeated to discharge the materil of a weight equal to or most closely approximating the target weight in each weighing cycle.

In the described embodiment, when the selected combination includes a weighing hopper and the storage hopper associated therewith, e.g. when the selected combination includes a first weighing hopper 2d and a first storage hopper 7 corresponding to the latter, a troublesome operation is required in which the first weighing hopper charged with a first batch of the articles delivers, after the weighing of the first batch of the articles, the first batch of articles to the first storage hopper and then the first weighing hopper is supplied with the second batch of articles the weight of which is weighed and stored in the memory section 8.

Alternatively, the arrangement may be as follows.

(a) The combinatorial computation is made in such a manner as to avoid the simultaneous selection of a weighing hopper and the associated storage hopper, in the determination of the best combination.

(b) When a weighing hopper and the associated storage hopper are selected simultaneously, the selected weighing hopper and the storage hopper are excluded from the present combinatorial computation but the weighing results with these hoppers are stored only in the memory section 8 to take part in the next cycle of combinatorial computation.

(c) The weighing hopper solely is charged with a new batch of articles and the weight thereof is stored in the memory section to take part in the next cycle of combinatorial computation. If this weighing hopper is not selected in the next cycle of combinatorial computation, the inner hopper gate 2e of this weighing hopper is shifted from this weighing hopper into the associated storage hopper, and the weight of this batch of articles is stored as the weight of the articles in the associated storage hopper. Simultaneously, the evacuated weighing hopper is supplied with a new batch of articles the weight of which is weighed and stored in the memory section. The weights thus stored are taken into consideration in the next cycle of combinatorial computation.

In the combinatorial weighing apparatus of this embodiment having the construction described heretofore, the number (2N) of the weight data available for the combinatorial computation is twice as large as the number (N) of the weight sensors 3 because the weights of the articles in the weighing hoppers and the weights of the articles in the storage hoppers are measured and stored in the memory section to take part in the combinatorial computation. In consequence, the weighing accuracy and, hence, the reliability of the apparatus are improved remarkably. The weighing speed is sufficiently high because each weight sensor is required only to weigh the articles supplied to the associated weighing hopper and storage hopper.

Needless to say, the present invention can be applied to an automatic counting apparatus in which the number of articles are counted by the steps of: calculating the number of articles supplied into each of a plurality of weighing hoppers by dividing the measured weight by the weight of each article, conducting a combinatorial computation on the basis of the thus calculated number of pieces of articles to determine and select the "best" combination which provides a total number equal to or closest to the target number, making the selected weighing hoppers discharge the articles, and collecting the discharged articles by means of a chute or the like.

In the described embodiment, the weighing apparatus is provided with pool hoppers 2d. The pool hopper 2d is intended for the following purposes. Namely, in the combinatorial weighing apparatus of the type described, there is a fear that the article is dropped even after the stop of vibration of the distribution supply device 2a from the end of the trough 2a into the hopper under weighing by the force of gravity or as a result of transmission of vibration from another apparatus. This fear, however, is completely eliminated by the use of the pool hopper 2d in the described embodiment. The use of the pool hopper offers another advantage that the batches of articles to be put into weighing are beforehand pooled in the idle time in which the combinatorial computation is being made, so that the period of the weighing cycle is shortened advantageously.

Thus, the provision of the pool hopper is not essential in the combinatorial weighing apparatus of the invention. Namely, the pool hoppers 2d may be substituted by shutters or the like device which are provided on the ends of the troughs to prevent the articles from dropping into the weighing hoppers. Alternatively, when the stacked articles are such one as can hardly be collapsed or when the rate of supply is so small that the articles form only a thin layer on the trough, the pool hoppers can be completely omitted. It will be understood that the advantage of the invention can never be lost even when the apparatus is modified in the manners stated above.

Figure 8:
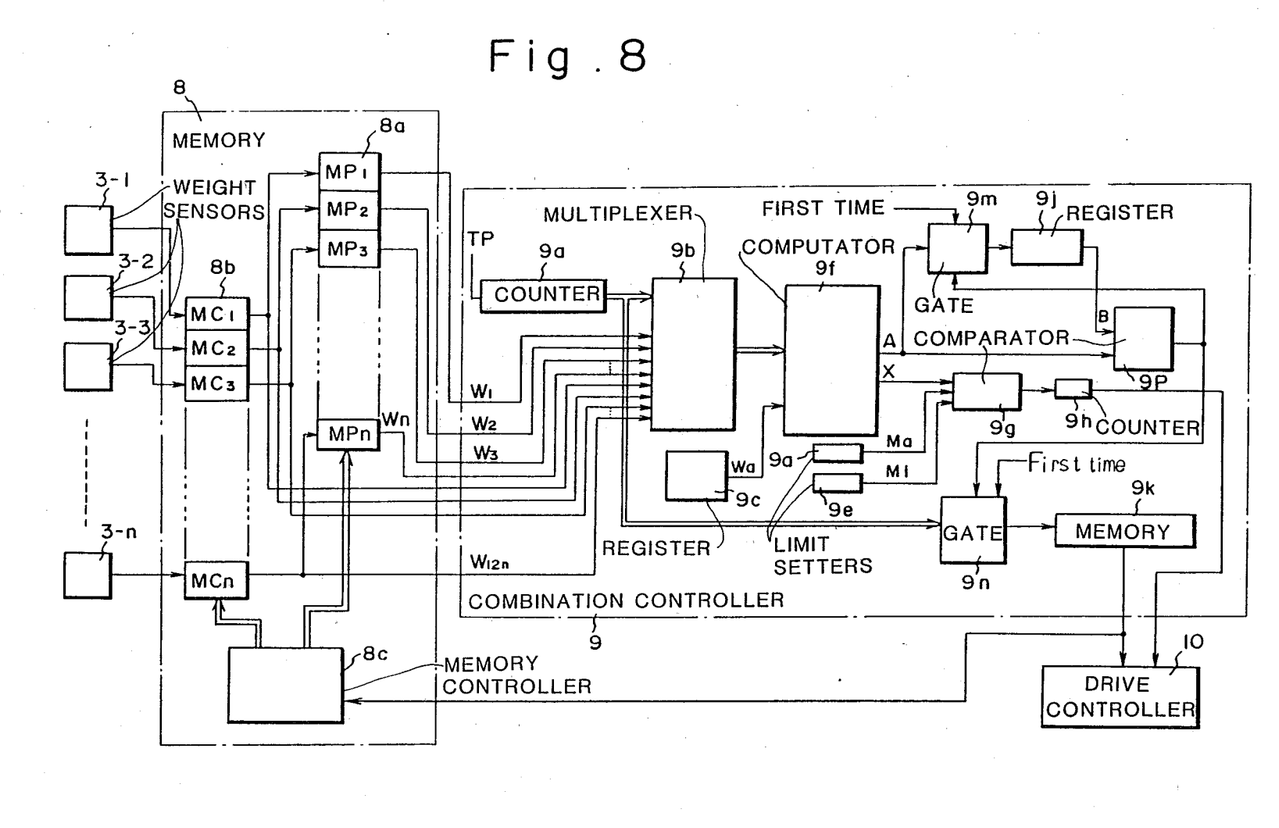
FIG. 8 is a block diagram of a memory and a combination control section incorporated in the combinatorial weighing apparatus shown in FIG. 6.

FIG. 8 is a detailed block diagram of the memory 8 and the combination control section 9 incorporated in the arrangement shown in FIG. 6. The memory 8 includes storage hopper memory section 8a (MP$_1$ to MP$_n$) which store the weight values of batches of articles in respective storage hoppers 7 and weighing hopper memory section 8b(MC$_1$ to MC$_n$) for storing the weight values of the batches of articles in the weighing hoppers 2d. The weighing hopper memories MC$_1$ to MC$_n$ are connected to respective weight sensors 3-1,3-2, ..., 3-n, while the storage hopper memories MP$_1$ to MP$_n$ are connected to respective weighing hopper memories MC$_1$ to MC$_n$. A memory control section 8c controls the storing and erasing operation in the storage hopper memory section 8a and weighing hopper memory section 8b.

The combination control section 9 includes a 2N-bit counter 9a adapted to count timing pulses TP of a predetermined period and to produce patterns of combinations of n pieces of weighing hoppers and n pieces of storage hoppers. There are 2n cases of selection when only one hopper is selected from a group of hoppers consisting of n pieces of weighing hoppers and n pieces of storage hoppers. Also, there are 2n(2n−1)/2! cases of selection when 2 hoppers are selected out of 2n pieces of hoppers. When r pieces of hoppers are to be selected out of the 2n pieces of the hoppers, the number of possible cases of selection is represented by 2n(2n−1) (2n−2) ... (2n−r+1)/r!. In consequence, the total number of the possible combinations is expressed by $2^{2n}-1$. It is, therefore, possible to make the binary 2n-bit counter 9a to generate ($2^{2n}-1$) kinds of bit patterns (000...001 to 111...111) by supplying ($2^{2n}-1$) pieces of timing pulse TP. According to the described embodiment, the first bit of the counter 9a is alloted to the first region MP$_1$ of the storage hopper memory section 8a, and the second bit is alloted to the second region MP$_2$ of the storage hopper memory section 8a. Similarly, the n the bit of the counter 9a is alloted to the n th region of the storage hopper memory section 8a. On the other hand, the (n+1) th bit, (n+2) th bit and the 2nth bit of the counter 9a are alloted to the first, second and the n th regions MC$_1$, MD$_2$ and MC$_n$ of the weighing hopper memory section 8b. According to this arrangement, the bit patterns offered by the counter 9a are the possible patterns of the combination. A reference numeral 9b designates a multiplexer which is dapted to deliver to the computation section the weight values stored in the regions MP$_1$ to MP$_n$ and MC$_1$ to MC$_n$ of the memory sections 8a,8B corresponding to respective bit patterns offered by the counter 9a. For instance, when the counted value is 1000101011 where 2n=10, the outputs W$_1$,W$_2$,W$_4$,W$_6$ and W$_{10}$, derived respectively from the first, second and fourth regions MP$_1$,MP$_2$ and MP$_4$ of the storage hopper memory section 8a and the first and fifth regions MC$_1$ and MC$_5$ of the weighing hopper memory section 8b, are delivered to the compuation section. A reference numeral 9c designates a command value register adapted to store a command weight value Wa, while numerals 9d and 9e denote, respectively, an upper limit setting device and a lower limit setting device for storing the preferred tolerance of the weighing determined by an upper limit value Ma and a lower limit value Mi. The lower limit value is selected to be equal to the command weight value as a practice, in order to avoid any complaint by customers due to the shortage of the total weight which may be caused by a slight possible error.

A reference numeral 9f designates the computation section which computes and outputs the total weight value ΣWi(=X), as well as the offset of this total weight value ΣWi from the command value Wa and the absolute value of the offset. Namely, the computation section 9f performs the computation in accordance with the following formulae (1) and (2).

$$\Sigma Wi = X \qquad (1)$$

$$|\Sigma Wi - Wa| = A \qquad (2)$$

The computation section 9f then outputs the total weight value ΣWi(=X) and the absolute value A of offset (referred to simply as "offset", hereinunder) of the total weight value ΣWi from the command value Wa. Reference numerals 9g and 9h denote, respectively, a comparator and a moderate number counter. The comparator 9g makes a discrimination as to whether the total weight value X falls within the tolerance, i.e. between Mi and Ma, in accordance with the following formula (3).

$$Mi \leq X \leq Ma \qquad (3)$$

Then, if the condition of the formula (3) is met, the content of the moderate counter 9h is counted up. A reference numeral 9j designates a minimal offset memorizing register which stores the minimal offset. The offset value A is automatically set in this register only for the initial weighing, but the content of this register is altered progressively in a manner explained below. In the case where the lower limit value coincides with the command value, the minimal offset register 9j may initially store the difference between the upper limit value and the command value. A reference numeral 9K designates a "best" combination memory which stores the pattern corresponding to the "best" combination, 9m and 9n designate gates and 9p denotes a comparator. When the total weight value Wi falls within the tolerance, the comparator 9p makes a comparison between the offset value A derived from the computation section 9f and the minimal offset value B stored in the minimal offset storage register 9j. When the offset value A is smaller than the minimal offset value B, the offset value A is delivered through the gate 9m to the minimal offset memory register 9j and stored in the latter and, at the same time, the content (combination pattern) of the counter 9a is stored in the best combination memory 9k.

A reference numeral 10 designates a drive control section which is adapted to activate the hopper driving device 2g in accordance with the "best" combination when the content of the moderate number counter 9h is greater than "1", thereby to open predetermined weighing hopper gates 2f and the storage hopper gate 7a (See FIG. 7) to permit the weighed articles to be discharged into the collecting chute 5 from these weighing hoppers 2d and the storage hoppers 7. Meanwhile, the pool hopper gates 2c and the weighing hopper gates 2e are opened to charge the evacuated weighing hoppers 2d and storage hoppers 7 with new batches of articles.

The operation of this weighing apparatus will be explained below. At the initial stage of the operation, the weighing hoppers 2d and the storage hoppers 7 are charged with batches of the articles to be weighed. Namely, the distribution supply device 2a delivers the articles to be weighed to respective pool hoppers 2b. Then, the hopper driving portion 2g activates the levers to open the pool hopper gates 2c thereby to permit the batches of the articles to be delivered from the pool hoppers 2b into corresponding weighing hoppers 2d. The batches of articles in respective weighing hoppers 2d are then weighed by respective weight sensors 3. The measured weight values are then stored in corresponding regions $MC_1$ to $MC_n$ in the weighing hopper memory section 8b, under the control of the memory control section 8c. Then, the hopper drive device 2g is started in accordance with the instruction given by the drive control section 10 so as to open the inner hopper gates 2e of the weighing hoppers 2d thereby to permit the batches of articles to be discharged from the weighing hoppers 2d into corresponding storage hoppers 7. Simultaneously, the memory control section 8c operates to shift the weight values from the regions $MC_1$ thru $MC_n$ in the weighing hopper memory section 8b to corresponding regions $MP_1$ thru $MP_n$ in the storage hopper memory section 8a. Then, the distribution supply device 2a delivers the next batches of articles again to the pool hoppers 2b, and the gates 2c of the pool hoppers are opened so that the batches of articles are put into corresponding weighing hoppers 2d. The batches of articles in the weighing hoppers 2d are weighed by respective weight sensors 3 and the weight values are stored in the corresponding regions $MC_1$ thru $MC_n$ of the weighing hopper memory section 8b. Thus, batches of articles are put in respective storage hoppers 7 and the weights thereof are stored in the storage hopper memory section 8a and then batches of articles are supplied also to respective weighing hoppers 2d and the weights thereof are stored in the weighing hopper memory section 8b. Then, the multiplexer 9b receives the weight values $W_1$ to $W_n$ stored in the regions $MP_1$ to $MP_n$ of the storage hopper memory section 8a and the weight values $W_{n+1}$ to $W_{2n}$ stored in the regions $MC_1$ to $MC_n$ in the weighing hopper memory section 8b. The 2n-bit counter 9a (2n=10) counts the timing pulses TP of a predetermined period and generates $2^{2n}-1$ pieces of combination patterns. Namely, the content of the counter 9a is changed into 0000000001 upon counting the first timing pulse TP. In consequence, the multiplexer 9b delivers to the computation section 9f the value stored in the first region $MP_1$ of the storage hopper memory 8a, i.e. the weight value $W_1$, and the computation section then executes the computation in accordance with the formulae (1) and (2) to output the total weight value $\Sigma Wi$ of this combination and the offset $A(=|W_1-W_a|)$ of the total weight value $\Sigma Wi$ from the command value Wa. Since the gates 9n and 9m are kept opened only at the time of the first combinatorial computation, so that the offset value A is transferred to and stored in the minimal offset storage register 9j, and the content (combination pattern 000 . . . 01) of the counter 9a is stored in the best combination memory 9k. Meanwhile, the comparator 9g compares the total weight value $\Sigma Wi(=X)$ with the upper and lower limit values Ma and Mi. If the following condition is met, the content of the moderate weight counter 9h is counted up.

$$Mi \leq X \leq Ma$$

Then, as the second timing pulse TP is generated, the content (combination pattern) of the counter 9a is changed to 0000000010. As a result, the value (weight value $W_2$) stored in the second region $MP_2$ of the storage hopper memory 8a is delivered to the computation section 9f, so that the computation section 9f conducts the operation in accordance with the formulae (1) and (2) to output the total weight value $\Sigma Wi(=X)$ and the offset value $A(=|W_2-W_a|)$. Then, the comparator 9g makes a comparison as to whether the condition expressed by the formula (3) is satisfied. If the condition is met, the content of the moderate counter 9h is counted up by "1". Meanwhile, the comparator 9p compares the offset value A with the content $B(=|W_1-W_a|)$ of the minimal offset memory register 9j. Then, if the condition of $A \geq B$ is met, the contents of the minimal offset memory register 9j and the best combination memory 9k are not changed, whereas, if the above-mentioned condition is not met, i.e. if the condition is $A<B$ is met, the offset value A and the content of the 2n-bit counter 9a are transferred to and stored in the minimal offset memory register 9j and the best combination memory 9k, respectively. Then, the similar operation is repeated and the minimum offset out of the offset values provided by all of $2^{2n}-1$ pieces of combinations is stored in the minimal offset memory register 9j, while the combination pattern which provides this minimum offset is stored in the "best" combination memory 9k thus completing the selection of the "best" combination pattern. Thereafter, the number counted by the moderate counter 9h and the combination pattern stored in the "best" combination memory 9k are delivered to the drive control section 10. If the number counted by the moderate counter 9h is greater than "1", the drive control section 10 controls the hopper drive section 2g in accordance with the input combination pattern. Namely, the hopper gates 7a and the hopper gates 2f of the storage hoppers 7 and weighing hoppers 2d, selected in accordance with the contents of the bits forming the best combination pattern, are opened to permit the batches of articles in these hoppers 7,2d to be discharged into the collecting chute 5.

According to the invention, the leading n bits of the combination pattern are alloted for the weighing hoppers 2d, while the following n bits are alloted for the storage hoppers 7. Therefore, the pool hopper gates 2c of the pool hoppers 2b, which correspond to the weighing hoppers 2d selected by the leading n bits of the combination pattern, are opened to deliver the batches of articles from these pool hoppers 2b into the selected weighing hoppers 2d. At the same time, the weight values of the batches of articles thus supplied into the weighing hoppers 2d are weighed by the weight sensors 3 and these weight values are stored in the corresponding regions $MC_1$ to $MC_n$ in the weighing hopper memory section 8b, under the control of the memory control section 8c which receives the combination pattern. Subsequently, the hopper gates 2e of the weighing hoppers 2d, which correspond to the storage hoppers 7 selected by the following n bits of the combination pattern, are opened to deliver the batches of articles from these weighing hoppers 2d into the selected storage hoppers 7. At the same time, the memory control section 8c operates to shift the weight values from the corresponding regions $MC_1$ to $MC_n$ in the weighing hopper memory section 8b to the corresponding regions $MP_1$ to $MP_n$ of the storage storage hopper memory section 8a thereby to store these weight values in these regions $MP_1$ to $MP_n$. As a result, the weighing hoppers 2d corresponding to the selected storage hoppers 7 become empty. Therefore, using the following n bits of the combination pattern, the pool hopper gates 2c of the pool hoppers 2b corresponding to the empty weighing hoppers 2d are opened thereby to charge the empty weighing hoppers 2d with new batches of articles from these pool hoppers 2b. At the same time, the weight values of these new batches of articles are weighed by the weight sensors 3 and are stored in the corresponding regions $MC_1$ to $MC_n$ in the weighing hopper memory section 8b, under the control of the memory control section 8c. Meanwhile, the distribution supply devices 2a corresponding to the evacuated pool hoppers are vibrated for a predetermined time to charge the evacuated pool hoppers 2b with new batches of articles.

Subsequently, the combinatorial control is conducted in the manner explained before and the weighing operation is made continuously by the combinatorial weighing apparatus. When the content of the moderate counter 9h is zero, the articles are not discharged but the hoppers are charged with the article for the next combinatorial computation.

As will be understood from the foregoing description, the present invention offers the following advantages. Namely, according to the invention, 2N pieces of weight values are available for the selection of the "best" combination using N pieces of weight sensors, so that the weighing accuracy is improved correspondingly. For the same reason, the cost of the apparatus can be lowered economically because the number of weight sensors is reduced to a half as compared with that in the known weighing apparatus having equal weighing accuracy. In other words, when only N pieces of weighing data are enough to obtain the desired weighing accuracy, it suffices only to employ 2/N pieces of weight sensors. In consequence, it is possible to attain higher weighing accuracy without being accompanied by substantial increase in the size of the weighing apparatus and complication of the construction of the weighing apparatus.

Although the invention has been described through specific terms, it is to be understood that the described embodiment is only illustrative and various changes and modifications may be imparted thereto without departing from the scope of the invention which is limited solely by the appended claims.

What I claim is:

1. A method of combinatorial weighing of articles fed in batches through a plurality of corresponding input, weighing and storing paths for selecting a combination of said batches which provides a sum weight value satisfying a predetermined condition and for selective discharge of said selected combination of batches, comprising:
    in a given weighing and storing cycle of operation, supplying articles to provide batches of articles substantially simultaneously to at least selected ones of said plurality of input, weighing and storing paths, substantially simultaneously measuring the batches so supplied to determine the corresponding weight values thereof at a given, common position in each of said paths, storing the weight values for said measured batches while maintaining the identity of the respective batches, withdrawing the thus identified batches from the weighing positions in the respective said paths and retaining the identified batches in said paths,
    in a successive weighing and storing cycle of operation, supplying articles to provide batches of articles substantially simultaneously through at least selected ones of said plurality of input, weighing and storing paths, substantially simultaneously measuring the batches thus supplied to determine the corresponding weight values thereof and retaining said batches in said respective paths, and
    in a combination selection cycle, monitoring the weight values of the batches retained in the respective input, weighing and storing paths, for selecting a specific combination of those weight values which provides a sum weight satisfying said predetermined condition, and discharging the respective, identified batches having the weight values determined to satisfy the predetermined condition, and collecting the selectively discharged batches.

2. A method as recited in claim 1, further comprising:
    following each combination selection cycle, repeating said given and said successive weighing and storing cycles of operation, as required, to provide in each said path at least one batch of weighed articles retained in said path.

3. A method as recited in claim 1, further comprising, in each of said successive weighing and storing cycle of operation, retaining said weighed batch at said weighing position in said path for the duration of said cycle in which the batch is received therein.

4. A method as recited in claim 1, further comprising, when said given weighing and storing cycle of operation is the first cycle of operation, substantially simultaneously feeding articles through all of said plurality of corresponding input, weighing and storing paths and withdrawing said batches from said weighing positions in said respective paths while retaining said batches in said paths,
    when said successive weighing and storing cycle of operation is the second cycle, substantially simultaneously feeding articles in batches through all of said plurality of corresponding input, weighing and storing paths, and
    following each combination selection cycle, for any paths for which retained batches are discharged selectively from the storing positions of said paths, withdrawing any batch retained at the weighing position in each such path and transferring same to said storing position, and performing said successive weighing and storing cycle for such paths from which selected batches were discharged.

5. A combinatorial weighing system for selecting from a supply of articles a predetermined number of batches of articles having respective, measured weight values which in combination provide a sum weight value satisfying a predetermined condition, comprising:
    means for supplying articles in a plurality of paths to be separated into plural, successive batches in each said path,
    means in each said path operable in each of successive weighing cycles to receive and weigh an individual said batch and produce a corresponding weight value signal for said weighed batch,
    means in each said path for receiving from said weighing means at least one said batch weighed in a given weighing cycle and retaining said received and weighted batch in said path while said weighing means receives and weighs a successive said batch in a successive weighing cycle,
    means for storing the weight value signal for each said retained batch in each said path and identifying the said retained batch with its corresponding, stored weight value signal,
    means for selecting from said weight value signals produced by said weighting means in each of said paths, in said given and successive weighing cycles thereof for each of said retained and successive, weighed batches in each said path, a specific combination of measured weight values which provide a sum weight value satisfying a predetermined condition, and means for selectively discharging the respective batches identified by said selected weight value signals of said specific combination and for collecting the thus discharged batches.

6. A combinatorial weighing system as recited in claim 5 wherein:

said means in each said path operable in each of successive weighing cycles to receive and weigh an individual said batch comprises a weighing hopper;

said means in each said path for receiving from said weighing means at least one said batch weighed in a given weighing cycle and for retaining said received and weighed batch in said path comprises a storage hopper, said selected means selects a specific combination of measured weight values corresponding to the batches respectively stored in all of said weighing and storing hoppers, and said selective discharge means selectively discharges the respective batches, as identified by the selected weight value signals of the specific combination, from the weighing and storage hoppers which respectively retain the said respective, identified batches.

7. A combinatorial weighing system as recited in claim 6 wherein said selected means, in a given weighing cycle, selects weight value signals for only one of said weighing and storage hoppers of a given said path for any single, specific combination.

8. A combinatorial weighing system as recited in claim 5 wherein when said selecting means simultaneously selects weight value signals for the weighing hopper and storage hopper of a given said path in a given cycle of operation, said supplying means supplies a batch of articles to said weighing hopper of said simultaneously selected weighing and storage hoppers of a given said path during the time period associated with the successive said weighing cycle, and, when said selecting means does not select the weight signal for the weighing hopper of the theretofore simultaneously selected weighing and storage hoppers, the associate storage hopper receives and retains the batch of articles from the associated said weighing hopper and said article supplying means supplies a further batch of articles to said weighing hopper during the time period associated with the respectively next successive weighing cycle.

* * * * *

UNITED STATES PATENT AND TRADEMARK OFFICE
CERTIFICATE OF CORRECTION

PATENT NO. : 4,560,015

DATED : December 24, 1985

INVENTOR(S) : Kazukiyo Minamida

It is certified that error appears in the above-identified patent and that said Letters Patent is hereby corrected as shown below:

Front Page, [57] ABSTRACT, second paragraph, lines 2, 6 and 11, "article" should be --articles--;

Col. 1, line 15, "batch" should be --batches--;
lines 16, 20, 29, 38, 40, and 45, "article" should be --articles--;
line 60, "leeder" should be --leader--;
line 66, "article" should be --articles--;
line 67, "is" should be --are--.

Col. 2, lines 13, 16, 20, 27, 28 and 32, "article" should be --articles--.

Col. 3, line 64, "station as" should be --stations--.

Col. 4, line 30, "article is dischrged" should be --articles are discharged--;
line 31, "article is" should be --articles are--;
line 32, "dicharged" should be --discharged--;
line 65, before "articles" insert --of--.

Col. 5, line 40, "materil" should be --material--.

Col. 7, line 39, delete "the" first occurrence; and "alloted" should be --allotted--;
line 42, "alloted" should be --allotted--;
line 47, "dapted" should be --adapted--.

UNITED STATES PATENT AND TRADEMARK OFFICE
CERTIFICATE OF CORRECTION

PATENT NO. : 4,560,015

DATED : December 24, 1985

INVENTOR(S) : Kazukiyo Minamida

It is certified that error appears in the above-identified patent and that said Letters Patent is hereby corrected as shown below:

```
Col. 10, line 13, change "is" (second occurrence) to --of--;
         lines 39 and 40, "alloted" should be --allotted--.

Col. 11, line 17, "article" should be --articles--.

Col. 12, line 60, "weighted" should be --weighed--;
         line 68, "weighting" should be --weighing--.

Col. 13, line 21, "selected" should be --selecting--.

Col. 14, line 5, "selected" should be --selecting--.
```

Signed and Sealed this

Twentieth Day of May 1986

[SEAL]

*Attest:*

*Attesting Officer*

DONALD J. QUIGG

*Commissioner of Patents and Trademarks*